(12) United States Patent
Tagawa et al.

(10) Patent No.: US 6,751,052 B1
(45) Date of Patent: Jun. 15, 2004

(54) THIN FILM MAGNETIC HEAD WITH SHORT LOWER MAGNETIC POLE PIECE

(75) Inventors: Ikuya Tagawa, Kawasaki (JP); Tomoko Kutsuzawa, Kawasaki (JP); Syuji Nishida, Kawasaki (JP); Teruo Kiyomiya, Kawasaki (JP); Yoshinori Ohtsuka, Kawasaki (JP); Hiroshi Maeda, Kawasaki (JP); Minoru Hasegawa, Kawasaki (JP); Masahiro Kakehi, Kawasaki (JP); Takashi Sekikawa, Kawasaki (JP); Yukinori Ikegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 108 days.

(21) Appl. No.: 09/611,009

(22) Filed: Jul. 6, 2000

(30) Foreign Application Priority Data

Sep. 30, 1999 (JP) .............................. 11-277962
May 19, 2000 (JP) ....................... 2000-148073

(51) Int. Cl.⁷ .............................................. G11B 5/147
(52) U.S. Cl. ....................................................... 360/126
(58) Field of Search ................................. 360/126, 121, 360/125, 313, 128

(56) References Cited

U.S. PATENT DOCUMENTS

| 5,473,491 | A |   | 12/1995 | Fujisawa et al. | ............. | 360/126 |
| 5,805,391 | A |   | 9/1998  | Chang et al.    | ............. | 360/113 |
| 5,831,801 | A | * | 11/1998 | Shouji et al.   | ............. | 360/126 |
| 5,850,325 | A | * | 12/1998 | Miyauchi et al. | ............. | 360/113 |
| 5,872,693 | A |   | 2/1999  | Yoda et al.     | ............. | 360/126 |
| 5,995,338 | A | * | 11/1999 | Watanabe et al. | ............. | 360/113 |
| 6,055,137 | A | * | 4/2000  | Ishiwata et al. | ............. | 360/113 |
| 6,108,167 | A | * | 8/2000  | Tateyama et al. | ............. | 360/126 |
| 6,169,642 | B1 | * | 1/2001 | Mino et al.    | ............. | 360/126 |
| 6,188,544 | B1 | * | 2/2001 | Mino           | ............. | 360/126 |
| 6,226,149 | B1 | * | 5/2001 | Dill et al.    | ............. | 360/126 |
| 6,252,748 | B1 | * | 6/2001 | Yamanaka et al. | ........... | 360/317 |
| 6,278,579 | B1 | * | 8/2001 | Narumi et al.  | ............. | 360/126 |
| 6,288,871 | B1 | * | 9/2001 | Tanabe         | ............. | 360/126 |
| 6,304,415 | B1 | * | 10/2001 | Tateyama et al. | ........... | 360/126 |

FOREIGN PATENT DOCUMENTS

| EP | 11-203630 | 7/1999 |
| EP | 11-213329 | 8/1999 |
| JP | 6314413   | 8/1994 |
| JP | 6314414   | 8/1994 |
| JP | 7225917   | 8/1995 |
| JP | 8147625   | 6/1996 |
| JP | 9212819   | 8/1997 |
| JP | 117609    | 1/1999 |
| JP | 11149620  | 6/1999 |
| JP | 117609    | 12/1999 |

* cited by examiner

*Primary Examiner*—Robert S. Tupper
(74) *Attorney, Agent, or Firm*—Greer, Burns & Crain, Ltd.

(57) ABSTRACT

A thin film magnetic head includes an upper and a lower magnetic pole layer extending forward from a central magnetic core within a thin film coil. A narrow upper and lower front magnetic pole piece are connected to the front ends of the upper and lower magnetic pole layer, respectively. The upper front magnetic pole piece extends rearward from its front end exposed at a medium-opposed surface. The lower front magnetic pole piece extends in a lateral direction along the medium-opposed surface by a lateral width larger than that of the upper front magnetic pole piece. The lower front magnetic pole piece extends rearward from the medium-opposed surface by a longitudinal length smaller than that of the upper front magnetic pole piece. The lower front magnetic pole piece serves to concentrate the magnetic flux at the front ends of the upper and lower front magnetic pole pieces. Since the lower front magnetic pole piece is designed to have a larger lateral width in the lateral direction irrespective of a smaller length in the longitudinal direction, the production of the lower front magnetic pole piece can remarkably be facilitated.

20 Claims, 10 Drawing Sheets

THIN FILM MAGNETIC HEAD WITH SHORT LOWER MAGNETIC POLE PIECE

BACKGROUND OF THE INVENTION

1. Field of the Invention

The present invention relates to a thin film magnetic head in general employed in a magnetic recording medium drive such as a magnetic disk drive, including a hard disk drive (HDD), and a magnetic tape drive.

2. Description of the Prior Art

A thin film magnetic head in general comprises a central magnetic core disposed within a thin film coil spreading over a plane. An upper and a lower magnetic pole layer are designed to extend forward from the central magnetic core, respectively, toward a medium-opposed surface of a head slider. The head slider is designed to be opposed to a recording disk at the medium-opposed surface such as a bottom surface, including an air bearing surface, for example. The gap layer is interposed between the upper and lower magnetic pole layers.

The tip or front end of the upper magnetic pole layer is received at a narrower upper front magnetic pole piece exposing its tip or front end at the medium-opposed surface, as is disclosed in Japanese Patent Application Laid-open No. 7-225917, for example. The upper front magnetic pole piece is opposed to the front end of a narrower lower magnetic pole piece across the gap layer. The lower front magnetic pole piece is connected to the front end of the lower magnetic pole layer.

The disclosed thin film magnetic head is designed to allow magnetic flux, generated in the thin film coil, to be transmitted to the upper front magnetic pole piece through the upper magnetic pole layer. If the upper front magnetic pole piece is designed to contact the upper magnetic pole layer over a larger contact area, saturation of the magnetic flux can be suppressed at the contact area, so that a larger or stronger magnetic field for recordation can be obtained at the gap between the upper and lower front magnetic pole pieces along the medium-opposed surface. Accordingly, the upper front magnetic pole piece is required to extend rearward from the medium-opposed surface by a larger longitudinal length in the back-and-forth direction.

In recent years, a so-called core width of the upper and lower front magnetic pole pieces gets remarkably smaller or narrower than that of the upper magnetic pole layer, as is apparent from the aforementioned Japanese Patent Application Laid-open No. 7-225917. The core width can be measured along the medium-opposed surface in the lateral direction of a recording track. The narrower core width inevitably induces reduction in the magnetic field for recordation at the gap between the upper and lower front magnetic pole pieces along the medium-opposed surface.

Japanese Patent Application Laid-open No. 6-314414 discloses a proposal to maintain a stronger magnetic field for recordation at the gap between the upper and lower front magnetic pole pieces along the medium-opposed surface. The proposal employs a swelling with a backward step formed on the lower front magnetic pole piece at a location spaced from the medium-opposed surface. Such a swelling serves to concentrate the magnetic flux at the front ends of the upper and lower front magnetic pieces. A stronger magnetic field may leak out of the medium-opposed surface at the gap.

However, it is difficult to form or shape the swelling on the lower front magnetic pole piece of a narrower width and smaller dimensions. Even if the swelling can be formed, it is much difficult to align the narrower upper front magnetic pole piece with such a narrower swelling with the gap layer interposed therebetween.

SUMMARY OF THE INVENTION

It is accordingly an object of the present invention to provide a thin film magnetic head capable of aligning an upper front magnetic pole piece with a lower front magnetic pole piece without any difficulty even when the lower front magnetic pole piece is reduced in the longitudinal direction as compared with the upper front magnetic pole piece.

According to the present invention, there is provided a thin film magnetic head comprising: a thin film coil; a central magnetic core disposed within the thin film coil; an upper magnetic pole layer extending forward from the central magnetic core above a datum plane; a lower magnetic pole layer extending forward from the central magnetic core below the datum plane; an upper front magnetic pole piece receiving a front end of the upper magnetic pole layer and extending rearward over the datum plane from its front end exposed at a medium-opposed surface; and a lower front magnetic pole piece connected to a front end of the lower magnetic pole layer and extending below the datum plane in a lateral direction along the medium-opposed surface by a lateral width larger than that of the upper front magnetic pole piece, wherein the lower front magnetic pole piece extends rearward from the medium-opposed surface by a longitudinal length smaller than that of the upper front magnetic pole piece.

With the above arrangement, a magnetic flux generated in the central magnetic core within the thin film coil circulates through the upper and lower magnetic pole layers. In particular, the magnetic flux tends to run through the upper front magnetic pole piece of a first longitudinal length to the lower front magnetic pole piece of a second longitudinal length smaller than the first longitudinal length. The lower front magnetic pole piece serves to concentrate the magnetic flux at the front ends of the upper and lower front magnetic pole pieces. Accordingly, a larger or stronger magnetic field for recordation can be obtained along the medium-opposed surface of a head slider.

In addition, the lower front magnetic pole piece is designed to have a larger lateral width in the lateral direction irrespective of a smaller length in the longitudinal direction as described above. As compared with the case where the lower front magnetic pole piece is designed to have a narrower width corresponding to that of the upper front magnetic pole piece, the production of the lower front magnetic pole piece can remarkably be facilitated. Moreover, a larger width of the lower front magnetic pole piece in the lateral direction serves to facilitate alignment of the upper front magnetic pole piece with the lower front magnetic pole piece in the lateral direction.

The lower front magnetic pole piece is preferably designed to have a saturation flux density larger than that of the lower magnetic pole layer. The set saturation flux density contributes to reliable avoidance of saturation of flux in the lower front magnetic pole piece. In the case where 80Ni20Fe is employed in the lower magnetic pole layer for achieving Bs=1.0T, 50Ni50Fe or 45Ni55Fe can be employed for the lower front magnetic pole piece. 50Ni50Fe usually achieves Bs=1.4T, and 45Ni55Fe is usually employed to achieve Bs=1.6T.

The upper magnetic pole layer may retract its front end from the medium-opposed surface. The retracted upper magnetic pole layer serves to avoid undesirable leakage of magnetic flux which interferes with the magnetic field for recordation at the medium-opposed surface. In this case, if the lower front magnetic pole piece has the longitudinal length smaller than that of the upper front magnetic pole piece, the retracted upper magnetic pole layer fails to reduce or weaken the magnetic field for recordation. A conventional retracted upper magnetic pole layer tends to induce reduction in the magnitude of the magnetic field for recordation.

The lower front magnetic pole piece may be provided with a protrusion formed on an upper surface of the lower front magnetic pole piece so as to have a lateral width corresponding to that of the upper front magnetic pole piece. The protrusion is thus allowed to keep the aforementioned second longitudinal length while a narrower gap can be defined between the protrusion and the upper front magnetic pole piece. Accordingly, the width of a recording track on the recording medium can further be reduced, keeping a stronger or larger magnetic field for recordation.

Alternatively, the lower front magnetic pole piece may be provided with a longitudinal protrusion formed on an upper surface of the lower front magnetic pole piece so as to extend rearward from the medium-opposed surface by a third longitudinal length smaller than the second longitudinal length of the lower front magnetic pole piece. The longitudinal protrusion is designed to have a lateral width corresponding to that of the upper front magnetic pole piece. In this case, a lateral protrusion is preferably connected to the rear end of the longitudinal protrusion so as to extend on the upper surface of the lower front magnetic pole piece by the lateral width larger than that of the longitudinal protrusion.

The lateral protrusion serves to define a front wall surface standing from the lower front magnetic pole piece at a position retracted from the medium-opposed surface. The front wall surface defines, in addition to a first edge extending along the medium-opposed surface in the lateral direction from the front end of the longitudinal protrusion, a second edge extending in the lateral direction from the rear end of the longitudinal protrusion. In this type of the thin film magnetic head, the magnetic flux introduced into the lower front magnetic pole piece is allowed to run toward the upper front magnetic pole piece out of the first and second edges, respectively. The separation or divergence of the magnetic flux in this manner serves to reliably reduce or suppress the leakage of a magnetic field out of the medium-opposed surface from the lower front magnetic pole piece. The reduction or suppression in the leakage of the magnetic field is expected to contribute to a further reduction in the width of a recording track.

The aforementioned thin film magnetic head can be employed in a recording medium drive such as a magnetic disk drive, including a hard disk drive (HDD), and a magnetic tape drive.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
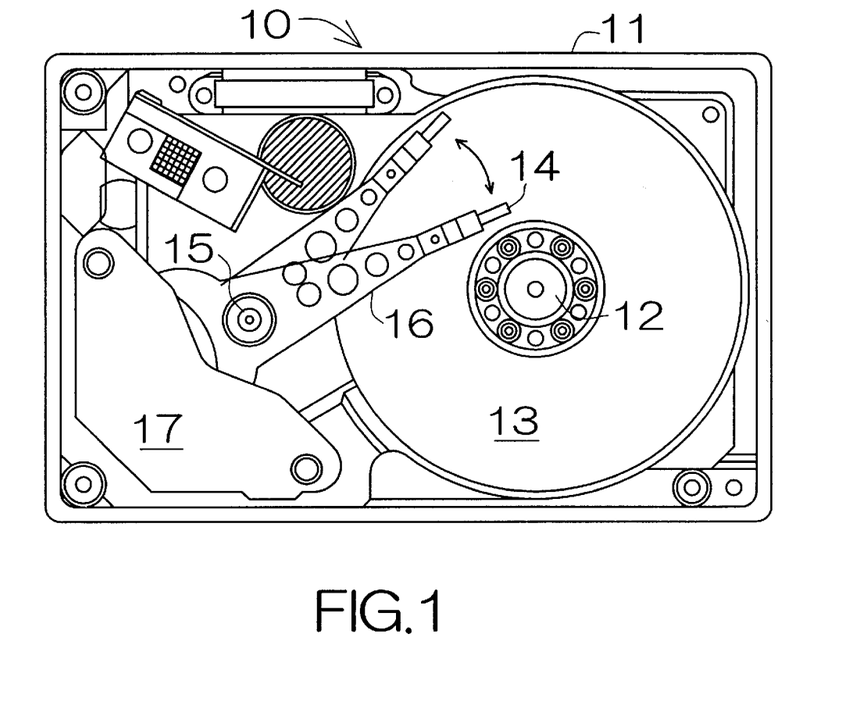
FIG. 1 is a plan view schematically illustrating the inner structure of a hard disk drive (HDD)

FIG. 1 illustrates the inner structure of a hard disk drive (HDD) 10 as an example of a magnetic recording medium drive. An enclosure 11 of the HDD 10 contains a magnetic recording medium such as a magnetic disk 13 mounted on a rotational axis of a spindle motor 12, for example, and a flying or air bearing head slider 14 opposed to the surface of the magnetic disk 13. The flying head slider 14 is fixed at the tip end of a carriage arm 16 capable of swinging around a support axis 15. When information data is read out of or written into the recording disk 13, an actuator 17 comprising a magnetic circuit such as a voice coil motor drives the carriage arm 16 for swinging movement, so that the flying head slider 14 at the tip end of the carriage arm 16 is positioned above a target recording track on the surface of the magnetic disk 13. A cover, not shown, may be coupled to the enclosure 11 so as to define a closed inner space.

Figure 2:
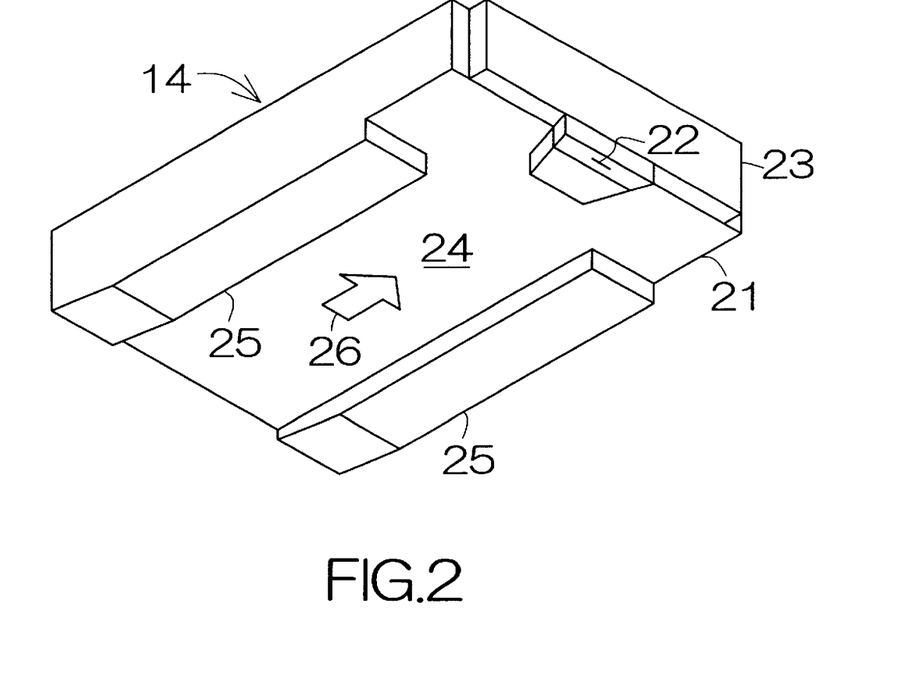
FIG. 2 is an enlarged perspective view illustrating an example of a flying head slider.

FIG. 2 illustrates an example of the flying head slider 14. The flying head slider 14 of the type comprises a slider body 21 made from $Al_2O_3$—TiC and a head protection layer 23, made from $Al_2O_3$, coupled to the outflow or trailing end of the slider body 21 for containing a read/write head 22. The slider body 21 and the head protection layer 23 are opposed to the surface of the magnetic disk 13 at a medium-opposed surface or bottom surface 24. A pair of rails 25 are formed to extend in a back-and-forth direction or the longitudinal direction of the slider body 21 so as to define an air bearing surface (ABS) at the top surface, respectively. When airflow 26 is generated to flow along the surface of the rotating magnetic disk 13, the flying head slider 14 is designed to receive the airflow 26 at the bottom surface 24, in particular, at the air bearing surfaces thereby to fly above the surface of the magnetic disk 13.

Figure 3:
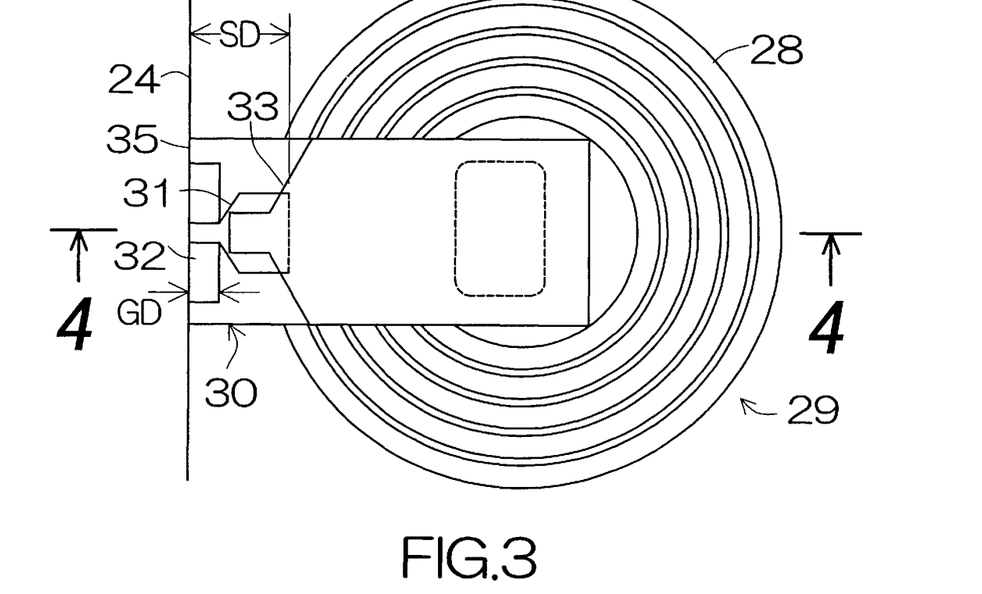
FIG. 3 is a plan view schematically illustrating the structure of an inductive write head or thin film magnetic head according to the present invention.

Referring to FIG. 3, the structure of the read/write head 22 is next described in detail. The read/write head 22 comprises an inductive write head element, namely, a thin film magnetic head 29 designed to write information data into the magnetic disk 13 by utilizing a magnetic flux generated at a thin film coil or conductive whirly pattern 28. The magnetic flux generated at the conductive whirly pattern 28 is adapted to circulate in a magnetic yoke 30 penetrating through the conductive whirly pattern 28.

The magnetic yoke 30 comprises an upper and a lower front magnetic pole piece 31, 32. The upper front magnetic pole piece 31 is designed to extend rearward by a first longitudinal length SD from its tip or front end exposed at the bottom surface 24. The lower front magnetic pole piece 32 is likewise designed to extend rearward by a second longitudinal length GD from its tip or front end exposed at the bottom surface 24. The second longitudinal length GD, of approximately 1.0 μm, for example, of the lower front magnetic pole piece 32 is set smaller than the first longitudinal length SD, of approximately 4.0 μm, for example, of the upper front magnetic pole piece 31. Moreover, the lower front magnetic pole piece 32 extends in the lateral direction along the bottom surface 24, as is apparent from FIG. 3, by a lateral length remarkably larger than that of the upper front magnetic pole piece 31. The lateral direction corresponds to a direction for defining the width of a recording track on the magnetic disk 13. The core width of the upper front magnetic pole piece 31 in the lateral direction may be set at approximately 0.3 μm, for example.

Figure 4:
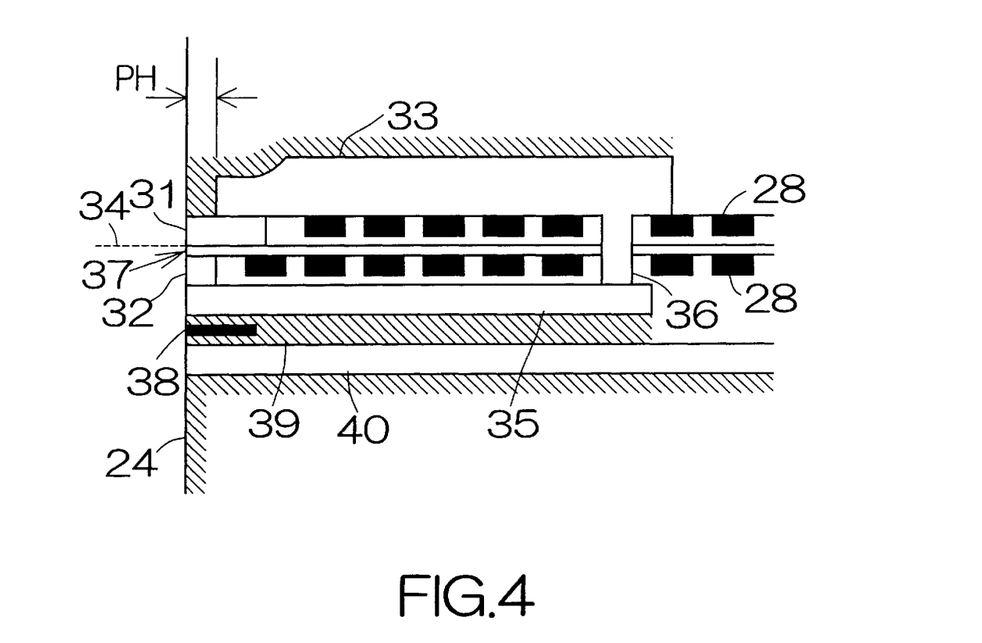
FIG. 4 is a partial sectional view taken along the line 4—4 in FIG. 3.

Referring also to FIG. 4, the magnetic yoke 30 further comprises a central magnetic core 36 disposed at the center of the conductive whirly pattern 28. An upper magnetic pole layer 33 extends forward from the central magnetic core 36 toward the bottom surface 24. The tip or front end of the upper magnetic pole layer 33 is received on the upper surface of the upper front magnetic pole piece 31. The upper magnetic pole layer 33 is designed to retract the front end from the bottom surface 24 by the depth PH=1.5 μm, for example. The upper magnetic pole layer 33 may be made from NiFe, for example. The thickness of the upper magnetic pole layer 33 may be set at approximately 0.3 μm while the upper front magnetic pole piece 31 may extend over a datum plane 34 in the longitudinal direction by a thickness of approximately 1.5 μm, for example.

A lower magnetic pole layer 35 likewise extends, below the datum plane 34, forward from the central magnetic core 36 until it reaches the bottom surface 24. The tip or front end of the lower magnetic pole layer 35 is connected to the lower front magnetic pole piece 32. The conductive whirly pattern 28 is disposed between the upper and lower magnetic pole layers 33, 35. The lower magnetic pole layer 35 may be made from NiFe, for example. The thickness of the lower magnetic pole layer 35 may be set at approximately 3.0 μm while the lower front magnetic pole piece 32 may extend over the surface of the lower magnetic pole layer 35 by a thickness of approximately 2.0 μm, for example. The conductive whirly pattern 28 may employ not only a multilayered structure, as shown in FIG. 4, but also a single layer structure, as is conventionally known.

A gap layer 37 is interposed between the upper and lower front magnetic pole pieces 31, 32 at the tip or front end of the magnetic yoke 30. When a magnetic flux circulates in the magnetic yoke 30 in response to supply of an electric current, the gap layer 37 serves to allow the magnetic flux to leak from the upper front magnetic pole piece 31 out of the bottom surface 24. Consequently, a narrow magnetic field for recordation can be obtained in accordance with the narrow core width of the upper front magnetic pole piece 31.

The thin film magnetic head 29 is formed on the surface of an Al₂O₃ layer 39 in which a read head element such as a magnetoresistive (MR) head 38 is embedded. The Al₂O₃ layer 39 is interposed between the lower magnetic pole layer 35 of the thin film magnetic head 29 and a lower magnetic shield layer 40 made from FeN or NiFe, for example. The lower magnetic pole layer 35 is designed to function as an upper shield layer for the MR head 38. The disposition of the MR head 38 forces the lower magnetic pole layer 35 to extend in the lateral direction by a lateral length remarkably larger than that of the upper magnetic pole layer 33 in the thin film magnetic head 29, as shown in FIG. 3. The MR head 38 may include a giant magnetoresistive (GMR) element, a tunnel junction magnetoresistive (TMR) element, and the like. The thin film magnetic head 29 can be employed independently from a magnetic read element.

Figure 5:
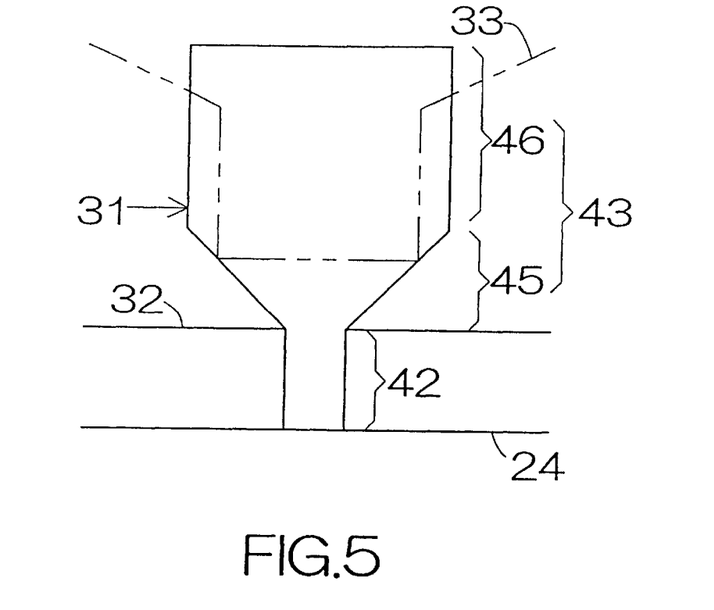
FIG. 5 is an enlarged plan view illustrating an upper front magnetic pole piece.

As shown in FIG. 5, the upper front magnetic pole piece 31 comprises a front extension component 42 extending rearward in the longitudinal direction over the datum plane 34 by a constant width in the lateral direction, and an intermediate component 43 extending rearward from the rear end of the front extension component 42 over the datum plane 34. The width of the intermediate component 43 in the lateral direction is set larger than that of the front extension component 42. The intermediate component 43 may be integral to the front extension component 42. The intermediate component 43 serves to establish a larger contact area between the upper magnetic pole layer 33 and the upper front magnetic pole piece 31. Saturation of magnetic flux can thus be suppressed at the contact area. Is it possible to avoid undesirable leakage of magnetic flux which interferes with the aforementioned magnetic field for recordation at the bottom surface 24.

The intermediate component 43 includes a front side layer 45 extending rearward from the rear end of the front extension component with its width gradually increasing in the lateral direction, and a rear side layer 46 connected to the rear end of the front side layer 45 so as to extend rearward by a constant width larger than the width of the upper magnetic pole layer 33 in the lateral direction. The width of the rear side layer 46 in the lateral direction may be set at approximately 2.0 μm, for example. The rear side layer 46 is thus designed to spread beyond the upper magnetic pole layer 33 in the lateral direction. The rear side layer 46 serves to reliably establish a larger contact area between the upper magnetic pole layer 33 and the upper front magnetic pole piece 31. Saturation of magnetic flux can reliably be suppressed at the contact area.

Now, assume that an electric current is supplied to the conductive whirly pattern 28 in the thin film magnetic head 29. A magnetic flux is induced in the central magnetic core 36 within the conductive whirly pattern 28. The magnetic flux circulates in the upper and lower magnetic pole layers 33, 35. The transmitted magnetic flux is adapted to leak from the narrower upper front magnetic pole piece 31 out of the bottom surface 24 so as to detour around the gap layer 37. A magnetic field for recordation can accordingly be established at the bottom surface 24. The magnetic field is designed to act on the surface of the magnetic disk 13 for magnetization. A narrower recording track can be defined on the surface of the magnetic disk 13 corresponding to the narrower core width of the upper front magnetic pole piece 31.

Figure 6:
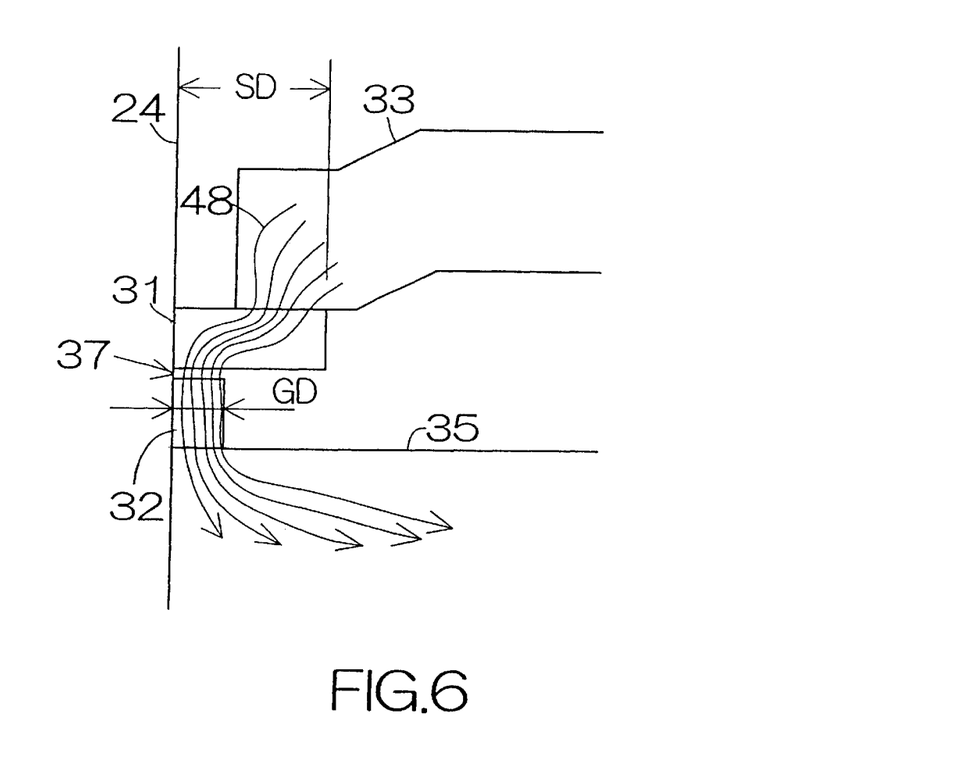
FIG. 6 is an enlarged partial sectional view of the thin film magnetic head for illustrating the course of a magnetic flux.

As shown in FIG. 6, the magnetic flux 48 is designed to run through the upper front magnetic pole piece 31 of the first longitudinal length SD to the lower front magnetic pole piece 32 of the second longitudinal length GD smaller than the first longitudinal length SD. The lower front magnetic pole piece 32 of the second longitudinal length GD serves to concentrate the magnetic flux 48 at the front ends of the upper and lower front magnetic pole pieces 31, 32, as is apparent from FIG. 6. A larger or stronger magnetic field for recordation can be obtained along the bottom surface 24. In particular, the upper magnetic pole layer 33 designed to retract its front end from the bottom surface 24 in the aforementioned manner tends to induce reduction in the magnitude of the magnetic field for recordation. The retracted front end of the upper magnetic pole layer 33 in combination with the aforementioned lower front magnetic pole piece 32 is supposed to be prevented from reduction in the magnetic field for recordation.

Next, a brief description will be made on production of the aforementioned thin film magnetic head 29. A wafer of $Al_2O_3$—TiC is prepared to provide the lower magnetic pole layer 33. The lower magnetic pole layer 33 have been formed on the $Al_2O_3$ layer 39 in which the MR element 38 is embedded. The $Al_2O_3$ layer 39 is layered on the lower magnetic shield layer 40.

Figure 7:
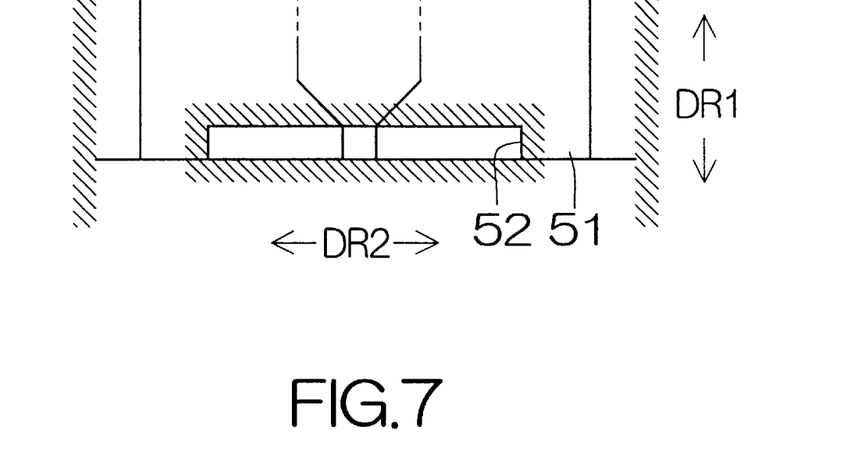
FIG. 7 is a plan view illustrating an example of a photoresist film for patterning the contour of a lower front magnetic pole piece.

The lower front magnetic pole piece 32 is subsequently formed on the surface of the lower magnetic pole layer 35. An electrodeposition may be employed to form the lower front magnetic pole piece 32, for example. When the electrodeposition is to be conducted, a photoresist film 51 may be formed on the surface of the lower magnetic pole layer 35, as shown in FIG. 7. The photoresist film 51 serves to define a void 52 patterned after the contour of the lower front magnetic pole piece 32. Since the lower front magnetic pole piece 32 is designed to largely extend in the lateral direction DR2, irrespective of the shorter length in the longitudinal direction DR1, the void 52 in the photoresist 51 can completely be filled with an electrolyte during the electrodeposition. The lower front magnetic pole piece 32 can precisely be formed in the designed shape.

Figure 8:
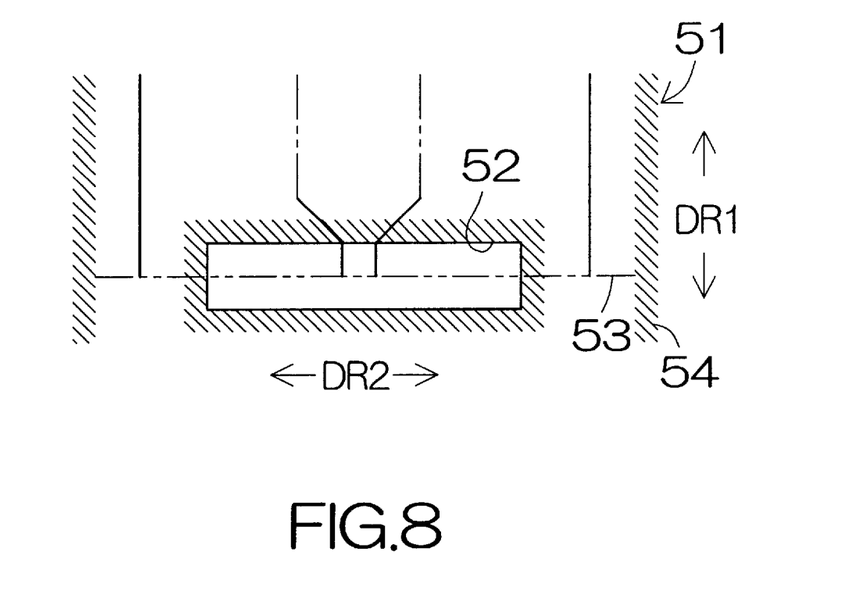
FIG. 8 is a plan view illustrating another example of a photoresist film for patterning the contour of the lower front magnetic pole piece.

Here, a marginal or auxiliary portion 54 can be included in the wafer of $Al_2O_3$—TiC, as shown in FIG. 8. The marginal portion 54 can be defined adjacent a primary portion corresponding to the finished slider body 21 of the flying head slider 14. A plane 53 corresponding to the finished bottom surface 24 of the slide body 21 is designed to divide the marginal portion 54 and the primary portion from each other. The marginal portion 54 serves to define the void 52 in the photoresist film 51 beyond the primary portion, so that the void 52 can be provided with a length larger than that of the expected lower front magnetic pole piece 32 in the longitudinal direction DR1. The void 52 of a larger size may contribute to a facilitated introduction of an electrolyte during the electrodeposition. The lower front magnetic pole piece 32 can precisely be formed in the designed shape more reliably. The marginal portion 54 can be removed in a subsequent process. After removal of the marginal portion 54, the bottom surface 24 of the slider body 21 is exposed.

Figure 9A:
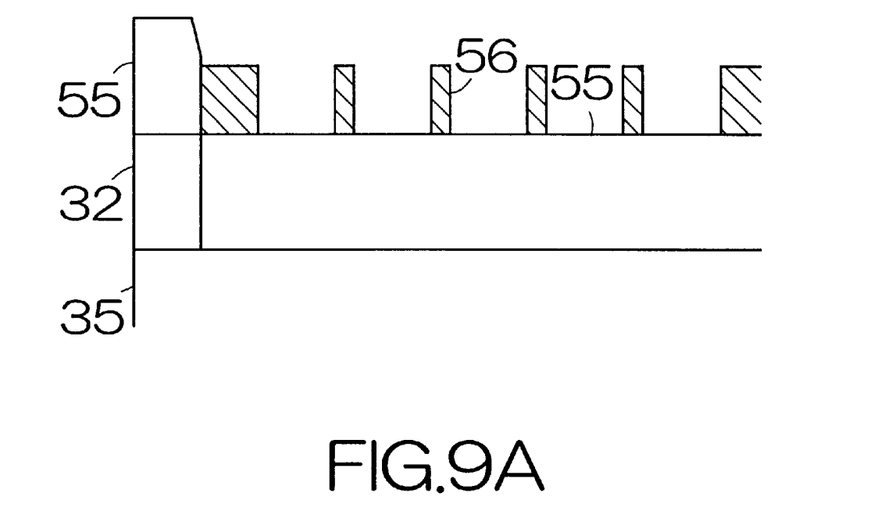
FIGS. 9A–9D schematically illustrate a process of forming the thin film magnetic head until a datum plane is formed.
Figure 9B:
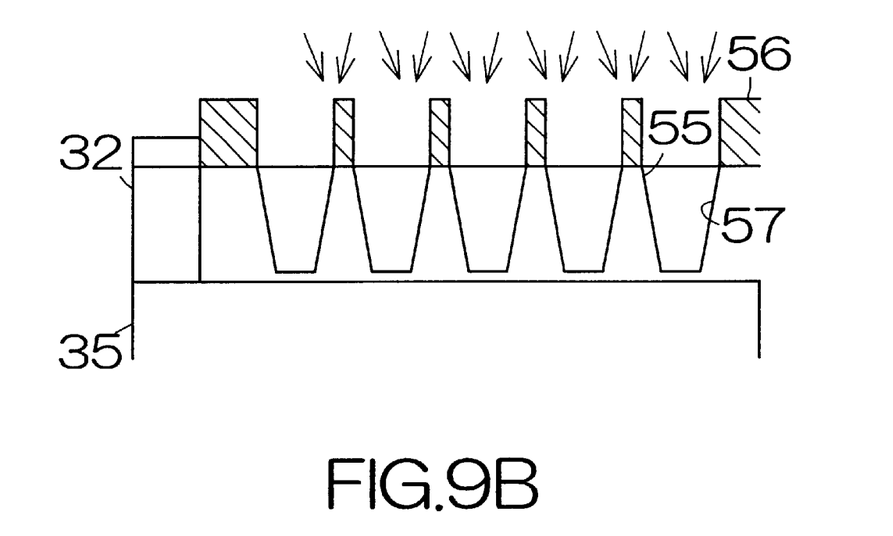
Figure 9C:
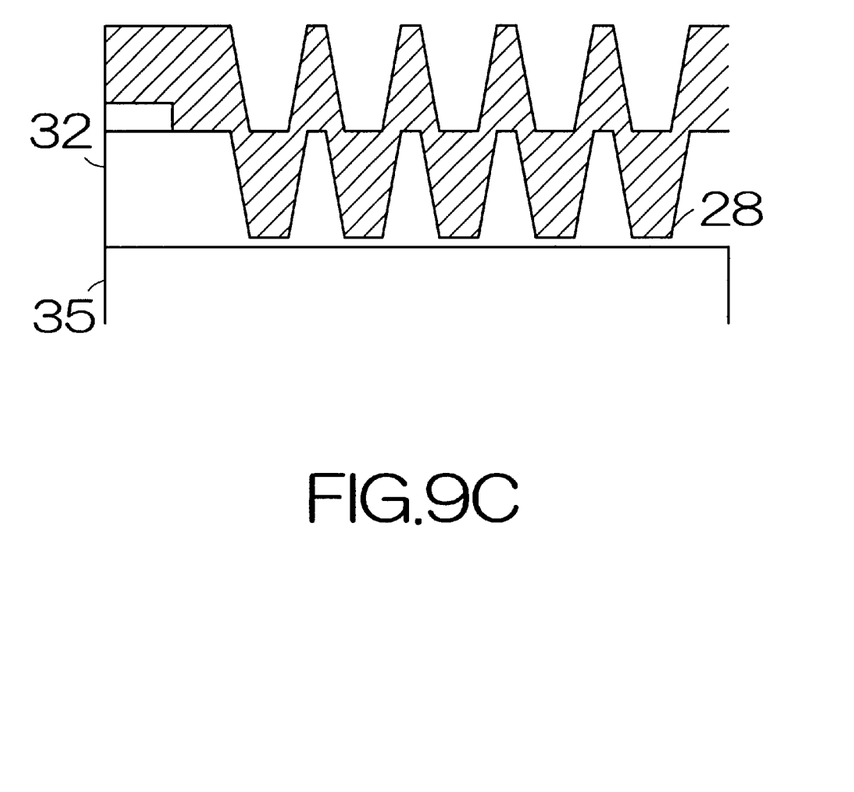

When the lower front magnetic pole piece 32 has been formed, an $SiO_2$ layer 55 is formed over the surface of the wafer, as shown in FIG. 9A. A photoresist film 56 is subsequently formed on the surface of the $SiO_2$ layer 55 for patterning the contour of the first or lower layer of the conductive whirly pattern 28. When an ion etching is conducted over the photoresist film 56, as shown in FIG. 9B, a whirly groove 57 is formed in the $SiO_2$ layer 55 for patterning the shape of the conductive whirly pattern 28. After removal of the photo resist film 56, the conductive whirly pattern 28 is allowed to grow in the groove 57 during an electrodeposition, for example, as shown in FIG. 9C. An $Al_2O_3$ layer can be employed in place of the $SiO_2$ layer 55 for an insulator.

Figure 9D:
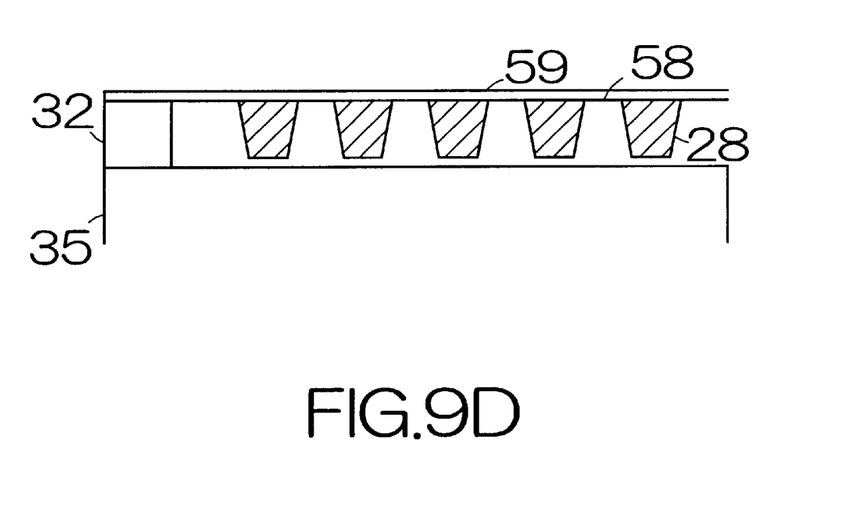

A flattening process such as a CMP (chemical mechanical polishing) is then applied to the surface of the wafer, so that a flat surface or plane 58 can be obtained, as shown in FIG. 9D. A non-magnetic layer 59 is layered over the flat surface 58. The surface of the non-magnetic layer 59 formed in this manner corresponds to the datum plane 34.

Figure 10:
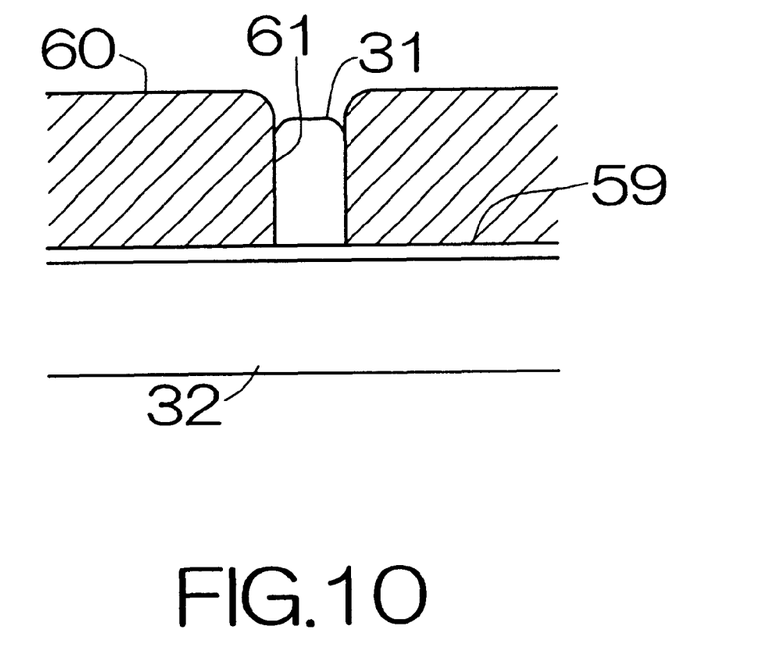
FIG. 10 schematically illustrates a process of forming the upper front magnetic pole piece.

As shown in FIG. 10, a photoresist film 60 is formed on the surface of the non-magnetic layer 59, namely, the datum plane 34. The photoresist film 60 is designed to define a void 61 for patterning the upper front magnetic pole piece 31. An electrodeposition allows a magnetic layer to grow in the void 61. The upper front magnetic pole piece 31 can be obtained in this manner. Since the lower front magnetic pole layer 32 is designed to have a larger dimension in the lateral direction, the upper front magnetic pole piece 31 can be aligned with the lower front magnetic pole piece 32 of a smaller longitudinal length relative to the upper front magnetic pole piece 31.

Figure 11A:
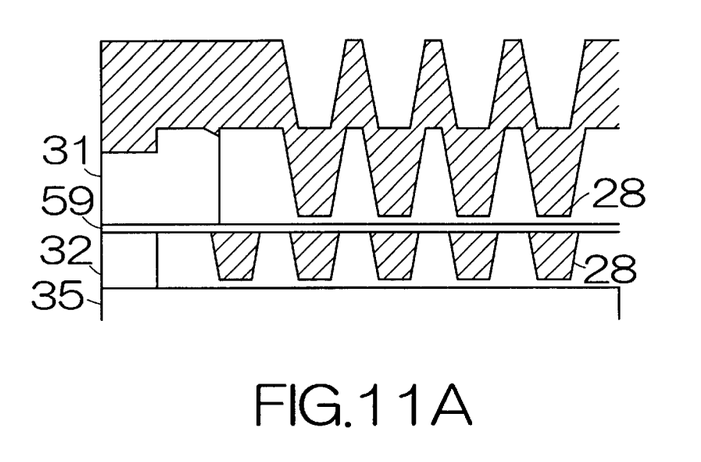
FIGS. 11A–11C schematically illustrate a process of forming the thin film magnetic head after the upper front magnetic pole piece has been formed.

When the upper front magnetic pole piece 31 has been formed in the aforementioned manner, the second or upper layer of the conductive whirly pattern 28 is then formed on the surface of the non-magnetic layer 59, namely, the datum plane 34. A whirly groove can be employed to pattern the shape of the conductive whirly pattern 28 in an $SiO_2$ layer in the above-described manner. When an electrodeposition is then conducted, the conductive whirly pattern 28 can be obtained, as shown in FIG. 11A. An $Al_2O_3$ layer can likewise be employed in place of the $SiO_2$ layer for an insulator.

Figure 11B:
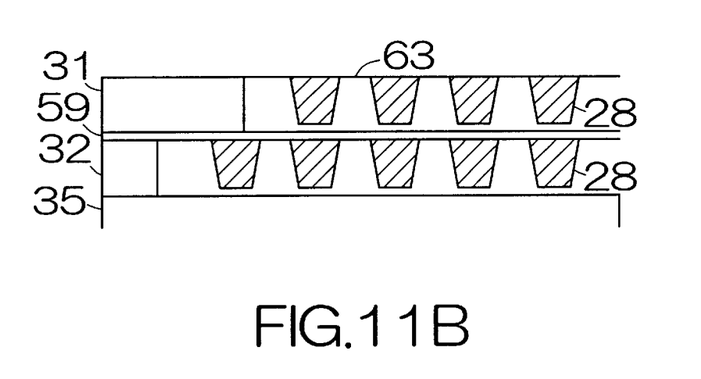
Figure 11C:
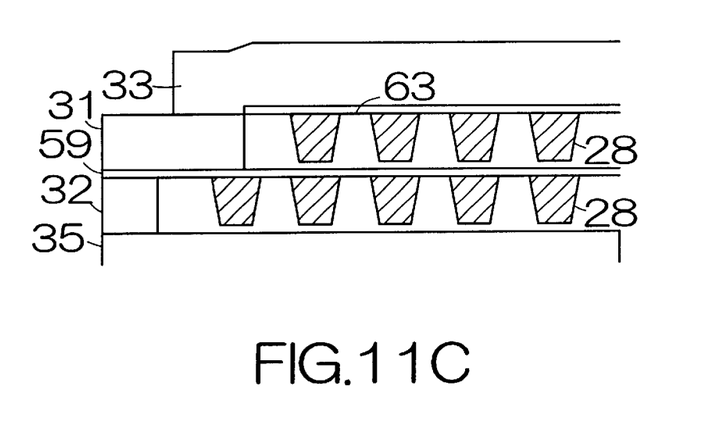

When the conductive whirly pattern 28 has been made in the aforementioned manner, as shown in FIG. 11B, a flattening process such as a CMP (chemical mechanical polishing) process is then applied to the surface of the wafer. Subsequently, the upper magnetic pole layer 33 is formed on a flat surface or plane 58, obtained by the flattening process, as shown in FIG. 1C. An electrodeposition or a sputtering can be employed to form the upper magnetic pole layer 33. Employment of the sputtering serves to realize the upper magnetic layer 33 made from materials, such as FeN, FeNAl$_2$O$_3$, FeZrN, CoFe, FeAl$_2$O$_3$, FeTaN, CoZrNb, and the like, for improving the saturation flux density Bs and/or the electric resistivity.

Figure 12:
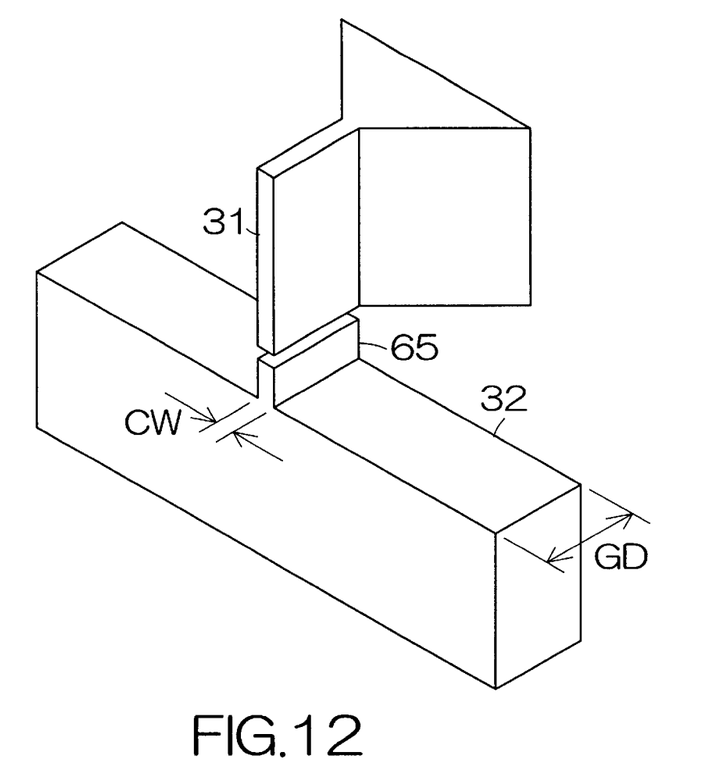
FIG. 12 is an enlarged partial perspective view schematically illustrating an example of an protrusion shaped out of the lower front magnetic pole piece.

As shown in FIG. 12, a tiny protrusion 65 may be formed to swell from the upper surface of the lower front magnetic pole piece 32 toward the upper front magnetic pole piece 31. The protrusion 65 may be integral to the lower front magnetic pole piece 32. The protrusion 65 is designed to have a contour partly reflecting that of the upper front magnetic pole piece 31. The protrusion 65 is thus allowed to have a lateral width corresponding to the core width CW of the upper front magnetic pole piece 31 while the second length GD can be maintained in the protrusion 65 in the longitudinal direction. Accordingly, a further narrower magnetic field for recordation can be obtained between the upper front magnetic pole piece 31 and the protrusion 65 on the lower front magnetic pole piece 32, while the magnetic field for recordation can be maintained at a stronger or larger level. The width of a recording track on the recording disk 13 can further be reduced.

Figure 13:
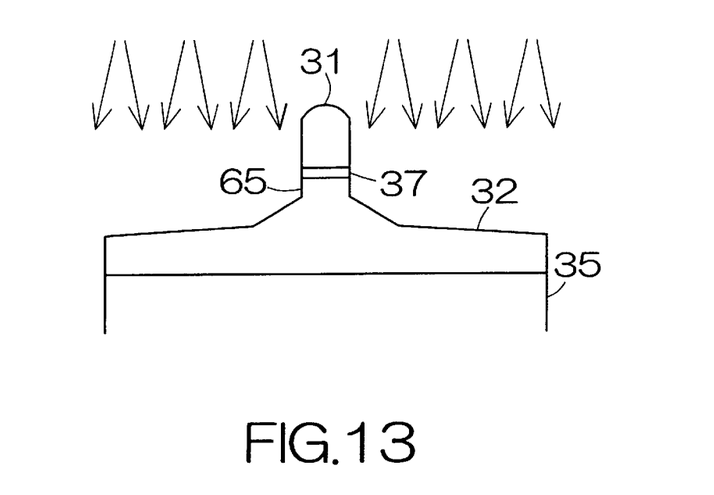
FIG. 13 schematically illustrates a process of forming the lower front magnetic pole piece.

In forming the protrusion 65 on the lower front magnetic pole piece 32, an ion milling can be employed utilizing the upper front magnetic pole piece 31 as a mask, as shown in FIG. 13. When the ion milling is conducted, the non-magnetic layer or the gap layer 37 can be removed outside the periphery of the upper front magnetic pole piece 31. At the same time, the lower front magnetic pole piece 32 suffers from partial removal outside the periphery of the upper front magnetic pole piece 31 below the gap layer 37, so that the protrusion 65 can be shaped out of the lower front magnetic pole piece 32. The thickness or height of the protrusion 65 may be set at approximately 0.2 μm from the final surface of the lower front magnetic pole piece 32.

Figure 14:
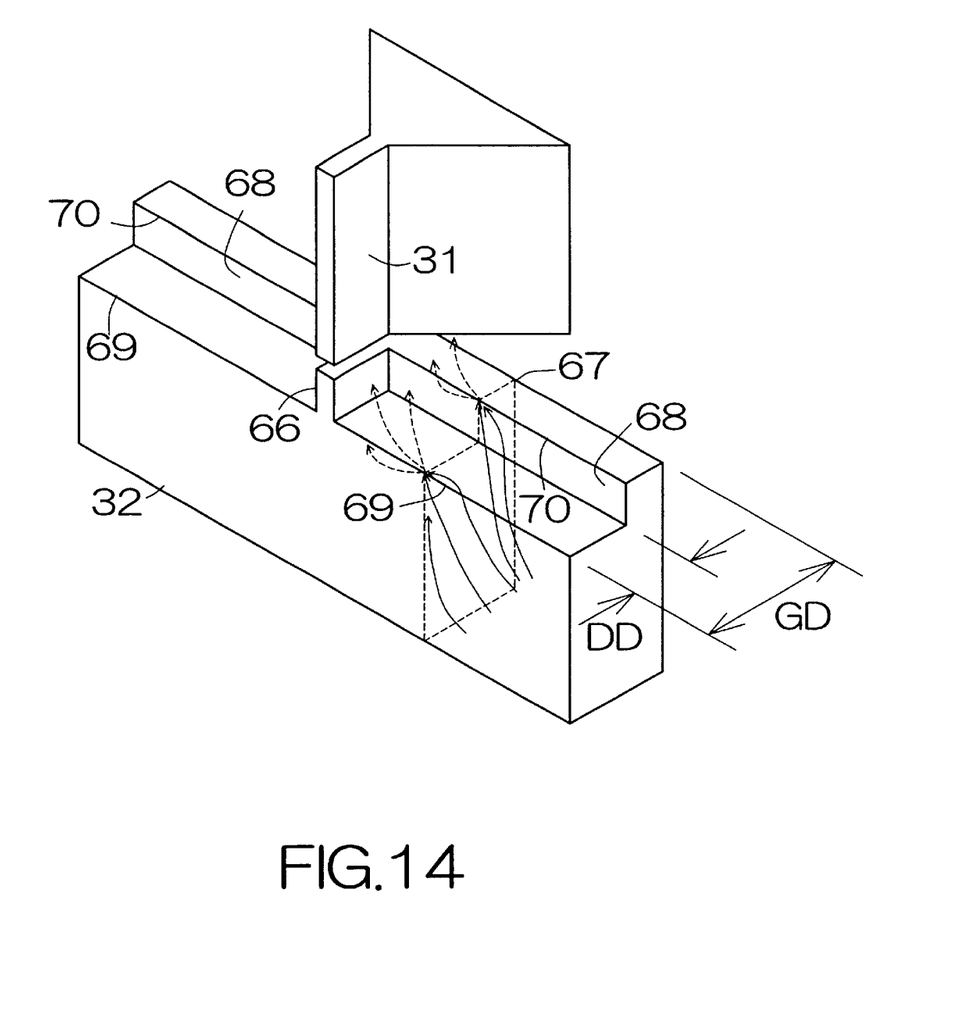
FIG. 14 is an enlarged partial perspective view schematically illustrating an example of longitudinal and lateral protrusions shaped out of the lower front magnetic pole piece.

Alternatively, a longitudinal protrusion 66 may be formed to swell from the upper surface of the lower front magnetic pole piece 32 toward the upper front magnetic pole piece 31, as shown in FIG. 14, for example. The longitudinal protrusion 66 is designed to extend rearward from the bottom surface 24 by a third longitudinal length DD smaller than the second longitudinal length GD of the lower front magnetic pole piece 32. At the same time, the longitudinal protrusion 66 is also designed to have the lateral width corresponding to that of the upper front magnetic pole piece 31.

A lateral protrusion 67 may be connected to the rear end of the longitudinal protrusion 66. The lateral protrusion 67 is designed to extend on the upper surface of the lower front magnetic pole piece 32 by the lateral width larger than that of the longitudinal protrusion 66. As is apparent from FIG. 14, the lateral protrusion 67 may have the lateral width set equal to that of the lower front magnetic pole piece 32.

When the lateral protrusion 67 is connected to the rear end of the longitudinal protrusion 66 in the above-described manner, a front wall surface 68 can be defined to stand from the surface of the lower front magnetic pole piece 32 at a position retracted from the bottom surface 24. The front wall surface 68 may be designed to extend in parallel with the bottom surface 24. The front wall surface 68 serves to define a first and a second edge 69, 70 on both sides of the longitudinal protrusion 66. The first edge 69 is allowed to extend along the bottom surface 24 in the lateral direction from the front end of the longitudinal protrusion 66, while the second edge 70 is allowed to extend in the lateral direction from the rear end of the longitudinal protrusion 66. The first and second edges 69, 70 may be extended in parallel with each other.

In general, it is well known that a magnetic flux is usually allowed to concentrate on the edge of a magnetic piece or body. The magnetic flux introduced into the lower front magnetic pole piece 32 can be led to the first and second edges 69, 70 in the aforementioned thin film magnetic head 29. The led magnetic flux is allowed to run through the first and second edges 69, 70 toward the upper front magnetic pole piece 31. The separation or divergence of the magnetic flux in this manner serves to reliably reduce or suppress the leakage of a magnetic field out of the bottom surface 24 from the lower front magnetic pole piece 32. The reduction or suppression in the leakage of the magnetic field is expected to contribute to a further reduction in the width of a recording track on the magnetic disk 13.

It should be noted that the lower front magnetic pole piece 32 is preferably designed to have a saturation flux density Bs larger than that of the lower magnetic pole layer 35. The set saturation flux density Bs contributes to reliable avoidance of saturation of flux in the lower front magnetic pole piece 32. In the case where 80Ni20Fe is employed in the lower magnetic pole layer 35 for achieving Bs=1.0T, 50Ni50Fe or 45Ni55Fe can be employed for the lower front magnetic pole piece 32. 50Ni50Fe usually achieves Bs=1.4T, and 45Ni55Fe is usually employed to achieve Bs=1.6T.

What is claimed is:

1. A thin film magnetic head comprising:
   a thin film coil;
   a central magnetic core disposed within the thin film coil;
   an upper magnetic pole layer extending forward from the central magnetic core above a datum plane;
   a lower magnetic pole layer extending forward from the central magnetic core below the datum plane;
   an upper front magnetic pole piece receiving a front and of the upper magnetic pole layer and extending rearward over the datum plane from its front end exposed at a medium-opposed surface; and
   a lower front magnetic pole piece connected to a front end of the lower magnetic pole layer and extending below the datum plane in a lateral direction along the medium-opposed surface by a lateral width larger than that of the upper front magnetic pole piece,
   wherein, the lower front magnetic pole piece extends rearward from the medium-opposed surface by a longitudinal length smaller than that of the upper front magnetic pole piece, and
   wherein the lower front magnetic pole piece is provided with a protrusion formed on an upper surface of the lower front magnetic pole piece so as to have a lateral width corresponding to that of the upper front magnetic pole piece.

2. The thin film magnetic head according to claim 1, wherein the lower front magnetic pole piece has a saturation flux density larger than that of the lower magnetic pole layer.

3. The thin film magnetic head according to claim 2, wherein the lower magnetic pole layer is made from 80Ni20Fe while the lower front magnetic pole piece is made from any of 50Ni50Fe or 45Ni55Fe.

4. The thin film magnetic head according to claim 1, wherein the upper magnetic pole layer is retracted from the medium-opposed surface.

5. The thin film magnetic head according to claim 1, wherein the upper front magnetic pole piece includes:
   a front extension component extending rearward from the medium-opposed surface over the datum plane by a constant width in the lateral direction; and
   an intermediate component extending rearward from a rear end of the front extension component over the datum plane and designed to have a lateral width larger than that of the front extension component.

6. The thin film magnetic head according to claim 5, wherein the intermediate component includes:
   a front side layer extending rearward from the rear end of the front extension component with a width smaller than that of the upper magnetic pole layer in the lateral direction; and
   a rear side layer extending rearward from a rear end of the front side layer by a width larger than that of the upper magnetic pole layer in the lateral direction.

7. The thin film magnetic head according to claim 1, wherein the upper front magnetic pole piece includes a layer extending rearward by a width larger than that of the upper magnetic pole layer in the lateral direction.

8. The thin film magnetic head according to claim 1,
   wherein the protrusion extends rearward from the medium-opposed surface by a longitudinal length smaller than that of the lower front magnetic pole piece; and
   wherein, the lower front magnetic pole piece is provided with a lateral protrusion connected to a rear end of the protrusion so as to extend on the upper surface of the lower front magnetic pole piece by a lateral width larger than that of the protrusion.

9. The thin film magnetic head according to claim 8, wherein the lower front magnetic pole piece has a saturation flux density larger than that of the lower magnetic pole layer.

10. The thin film magnetic head according to claim 9, wherein the lower magnetic pole layer is made from 80Ni20Fe while the lower front magnetic pole piece is made from any of 50Ni50Fe or 45Ni55Fe.

11. The thin film magnetic head according to claim 8, wherein the upper magnetic pole layer is retracted from the medium-opposed surface.

12. The thin film magnetic head according to claim 8, wherein the upper front magnetic pole piece includes:

a front extension component extending rearward from the medium-opposed surface over the datum plane by a constant width in the lateral direction; and an intermediate component extending rearward from a rear end of the front extension component over the datum plane and designed to have a lateral width larger than that of the front extension component.

13. The thin film magnetic head according to claim 12, wherein the intermediate component includes:

a front side layer extending rearward from the rear end of the front extension component with a width smaller than that of the upper magnetic pole layer in the lateral direction; and a rear side layer extending rearward from a rear end of the front side layer by a width larger than that of the upper magnetic pole layer in the lateral direction.

14. The thin film magnetic head according to claim 8, wherein the upper front magnetic pole piece includes a layer extending rearward by a width larger than that of the upper magnetic pole layer in the lateral direction.

15. A recording medium drive comprising:

a recording medium; and a thin film magnetic head opposed to the recording medium, wherein the thin film magnetic head includes:
a thin film coil;
a central magnetic core disposed within the thin film coil;
an upper magnetic pole layer extending forward from the central magnetic core above a datum plane;
a lower magnetic pole layer extending forward from the central magnetic core below the datum plane;
an upper front magnetic pole piece receiving a front end of the upper magnetic pole layer and extending rearward over the datum plane from its front end exposed at a medium-opposed surface: and a lower front magnetic pole piece connected to a front end of the lower magnetic pole layer and extending below the datum plane in a lateral direction along the medium-opposed surface by a lateral width larger than that of the upper front magnetic pole piece, wherein, the lower front magnetic pole piece extends rearward from the medium-opposed surface by a longitudinal length smaller than that of the upper front magnetic pole piece, and wherein the lower front magnetic pole piece is provided with a protrusion formed on an upper surface of the lower front magnetic pole piece so as to have a lateral width corresponding to that of the upper front magnetic pole piece.

16. The recording medium drive according to claim 15, wherein the recording medium is any of a magnetic tape and a magnetic disk.

17. The recording medium drive according to claim 15, wherein the protrusion extends rearward from the medium-opposed surface by a longitudinal length smaller than that of the lower front magnetic pole piece, and wherein the lower front magnetic pole piece is provided with a lateral protrusion connected to a rear end of the protrusion so as to extend on the upper surface of the lower front magnetic pole piece by a lateral width larger that of the protrusion.

18. The thin film magnetic head according to claim 15, wherein the lower front magnetic pole piece has a saturation flux density larger than that of the lower magnetic pole layer.

19. The thin film magnetic head according to claim 18, wherein the lower magnetic pole layer is made from 80Ni20Fe while the lower front magnetic pole piece is made from any of 50Ni50Fe or 45Ni55Fe.

20. The thin film magnetic head according to claim 15, wherein the upper magnetic pole layer is retracted from the medium-opposed surface.

* * * * *